(12) United States Patent
Fudala

(10) Patent No.: US 10,437,138 B1
(45) Date of Patent: Oct. 8, 2019

(54) CAMERA L-PLATE

(71) Applicant: Dariusz Fudala, Homer Glen, IL (US)

(72) Inventor: Dariusz Fudala, Homer Glen, IL (US)

( * ) Notice: Subject to any disclaimer, the term of this patent is extended or adjusted under 35 U.S.C. 154(b) by 0 days.

(21) Appl. No.: 15/952,948

(22) Filed: Apr. 13, 2018

(51) Int. Cl.
| | |
|---|---|
| *F16M 11/04* | (2006.01) |
| *F16M 13/02* | (2006.01) |
| *G03B 11/00* | (2006.01) |
| *G03B 11/04* | (2006.01) |
| *G03B 17/06* | (2006.01) |
| *G03B 17/12* | (2006.01) |
| *G03B 17/56* | (2006.01) |

(52) U.S. Cl.
CPC ............ *G03B 17/568* (2013.01); *F16M 11/04* (2013.01); *F16M 13/02* (2013.01); *G03B 17/561* (2013.01); *G03B 11/00* (2013.01); *G03B 11/04* (2013.01); *G03B 17/06* (2013.01); *G03B 17/12* (2013.01); *G03B 17/56* (2013.01)

(58) Field of Classification Search
CPC ...................................................... G03B 17/12
USPC ........................................................... 396/544
See application file for complete search history.

(56) References Cited

U.S. PATENT DOCUMENTS

| | | | | |
|---|---|---|---|---|
| 4,319,825 | A * | 3/1982 | Newton .............. | G03B 17/561 396/422 |
| 8,662,763 | B2 | 3/2014 | Vogt | |
| 9,280,039 | B2 * | 3/2016 | Johnson, Sr. ........ | G03B 17/561 |
| 9,372,383 | B2 * | 6/2016 | Johnson, Sr. ........ | G03B 17/568 |
| 2012/0281976 | A1 * | 11/2012 | Vogt .................... | F16M 11/041 396/428 |

* cited by examiner

*Primary Examiner* — Clayton E. LaBalle
*Assistant Examiner* — Kevin C Butler
(74) *Attorney, Agent, or Firm* — James D Palmatier; Applied Patent Services, PC

(57) ABSTRACT

A camera L-plate fixture for use with a camera comprising a base plate, a side plate and a retained connection holding the side plate an adjustable space from the base. The base plate comprising a first rod chamber, a second rod chamber, a first and second base screws in the base extending into the first and second rod chambers respectfully. The side plate adjustably attached to the base plate with the retained connection. The retained connection further comprising a pair of parallel rods slidably in the base and connected to the side plate. flat on each rod allows a respective screw in the base to limit travel of the rods to the range of the screws spaced from the respective flat. A header on the end of each rod bears against the screw to limit travel.

16 Claims, 2 Drawing Sheets

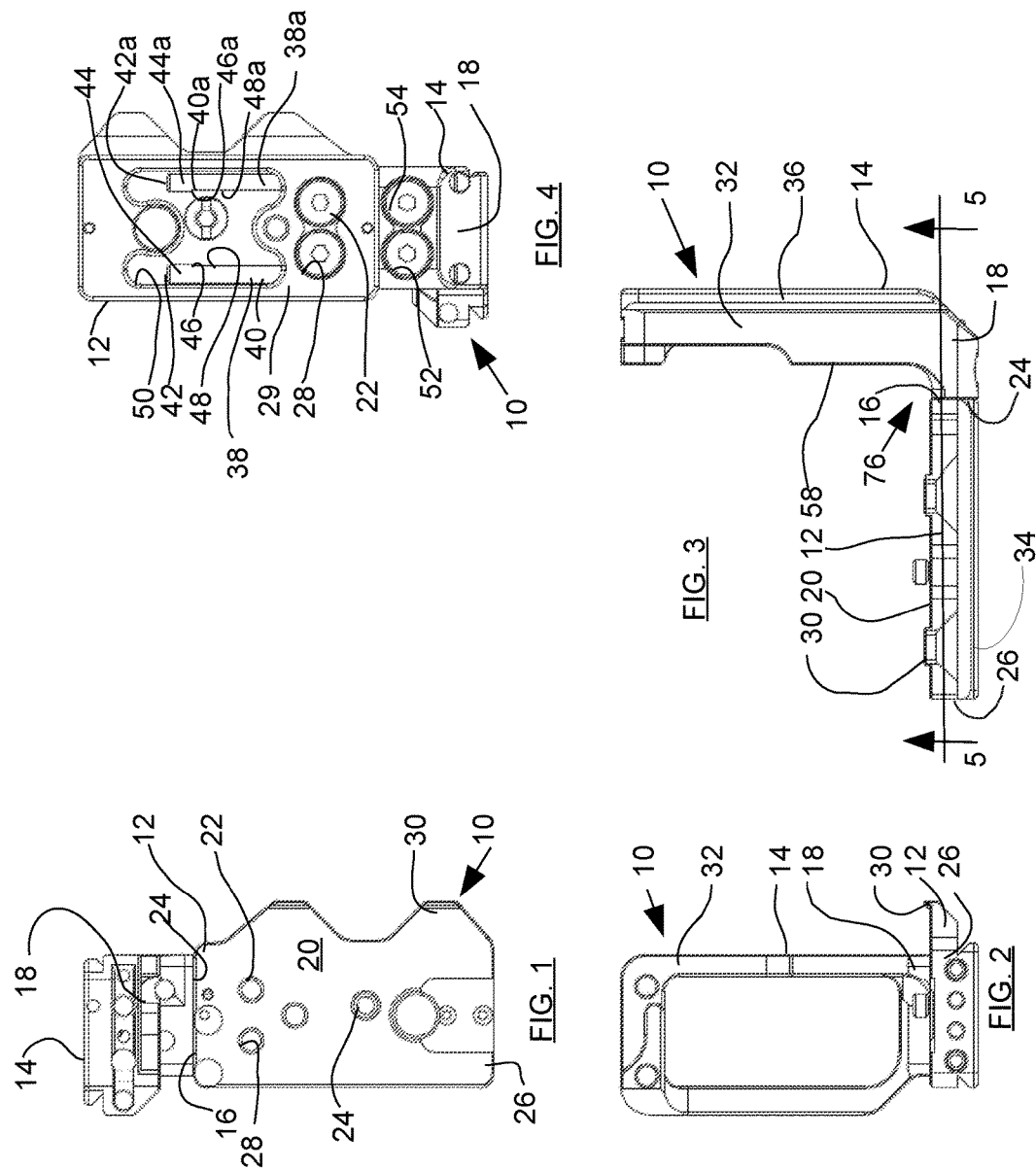

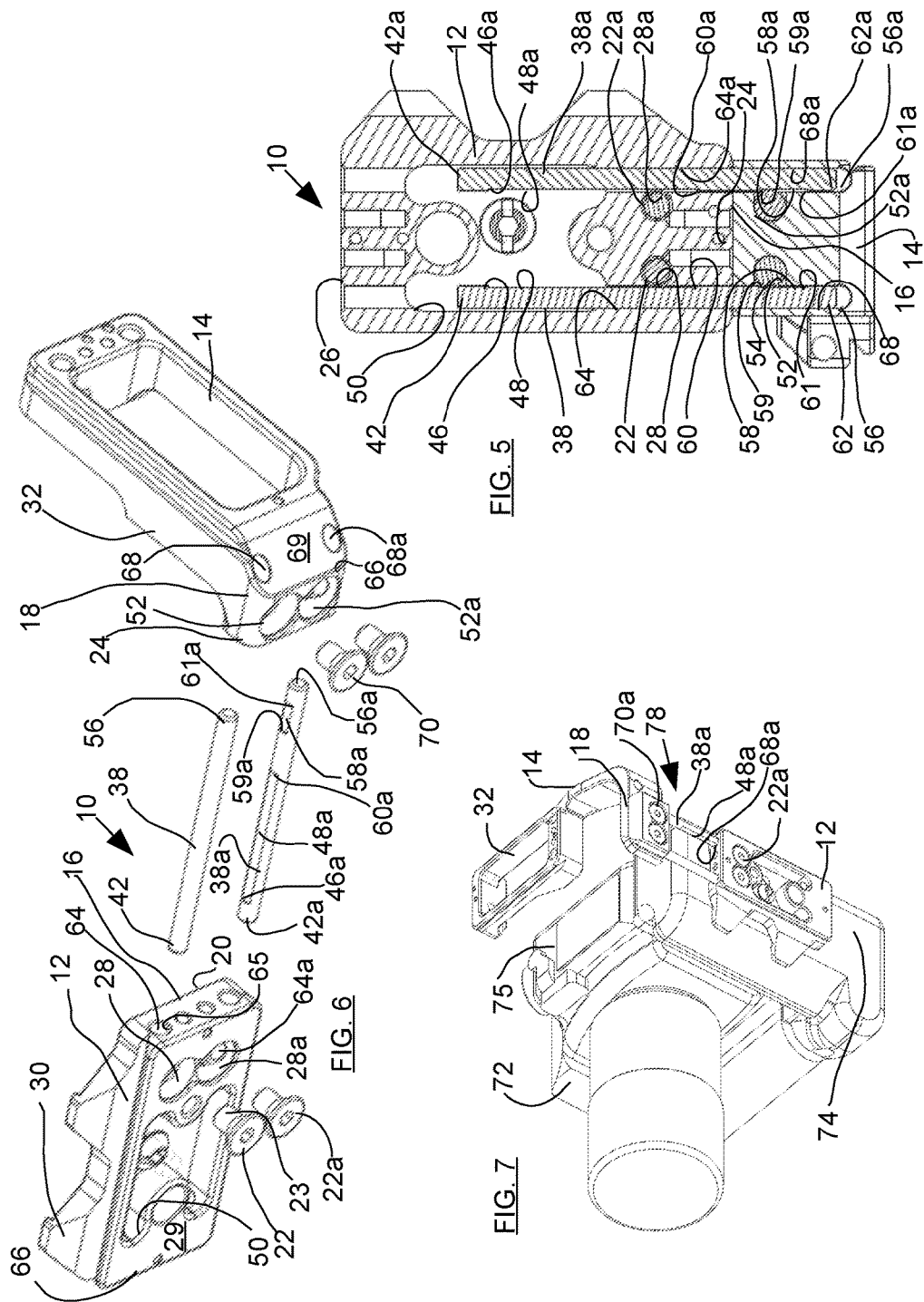

CAMERA L-PLATE

FIELD OF THE INVENTION

The present invention relates generally to L-plate fixtures for cameras.

BACKGROUND OF THE INVENTION

L-plate fixtures are attached to a camera to support external devices such as lighting while providing an attachment to support devices such as a tripod. The L-plate fixture comprises a base on the camera and a side plate. The side plate should be disposed at an adjustable spacing from the base while being retained to prevent unwanted disconnection. Prior art L-plate fixtures provide difficult to remove attachment between the base and the side plate. Other prior art L-plate fixtures provide easy to adjust mechanisms that allow unintended disconnection between the base and the side plate.

A L-plate fixture having an adjustable spacing between the base and side plate with a retaining interconnect arrangement is needed.

BRIEF DESCRIPTION OF THE PRESENT INVENTION

The L-plate fixture of this invention provides an base having a side plate fixable at an predetermined distance from the base. The retained connection prevents unwanted disconnection between the base and side plate. The retained connection comprises a rod interconnected between the base and side plate, the rod having a first base end and a flat. The flat is defined by two bevels on either end of the flat. The rod further comprising a first header between the flat and the first base end. The rod may further comprise a body end attached to the side plate. The rod may be slidably disposed in a rod chamber in the base. A rod screw hole in the base is in communication with and generally perpendicular to an adjacent rod chamber. A base screw, having a threaded shaft, is disposed in the rod screw hole. A portion of the threaded shaft extends into the adjacent rod chamber. The flat, oriented toward the rod screw, allows the rod to slidingly traverse in the rod chamber with the flat adjacent the rod screw. The first header bearing against a first base screw in the base to retain the first rod in the base while the flat clears the first base screw allowing the rod to slidably traverse in the base. The bevels define the travel limits of the rod as the portion of the threaded shaft will bear against the bevels to retain the rod in the rod chamber. The rod may be clamped the rod chamber to hold the side plate spaced a predetermined distance from the base. The L-plate fixture retained connection allows separation of the base from the side plate using simple tools to remove the rod screw, thus allowing the rod to slide out of the rod chamber.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE SEVERAL VIEWS OF THE DRAWING

FIG. 1 is a top plan view of the new camera L-plate.
FIG. 2 is a side elevation view of the new camera L-plate.
FIG. 3 is a front elevation view of the new camera L-plate.
FIG. 4 is a bottom plan view of the new camera L-plate.
FIG. 5 is a section view of the new camera L-plate 14 14 in the closed position taken at approximately 5-5 of FIG. 3.
FIG. 6 is an exploded view of the new camera L-plate.
FIG. 7 is a bottom perspective view of the new camera L-plate mounted on a camera.

DETAILED DESCRIPTION OF THE INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention. It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting. It should be appreciated that the invention can be used for any suitable.

Referring to FIG. 1, camera L-plate 10 may comprise a base 12, and a side plate 14. The base 12 may comprise a first side 16, a second side 26, a base top 20 and camera retention tabs 30. Side plate 12 may comprise a body 18 having an inside 24. Rod screw hole 28 is formed in base to threadably receive rod screws 22.

Referring to FIGS. 2 and 3, side plate 14 may comprise a loop 32 disposed on body 18. Loop 18 may extend approximately perpendicular to base 12. Base 12 may further comprise a second side 26 and a quick connect rail 34 for attachment. Side plate 14 may also comprise a quick connect rail 36 for attachment along loop 32. The camera L-plate 10 may be fixed in the closed position 76 having the first base side 16 adjacent the inside plate 24.

Referring to FIG. 4, base 12 further comprises a base bottom 29. Base 12 may be attached to side plate 14 by first rod 38 and second rod 32. First rod 38 may comprise a first shaft 40, a first base end 42, a first header 44, a first base bevel 46 and a first base flat 48. First header 44 is between first base end 42 and first base bevel 46. First base bevel 46 leads into first base flat 48. First base flat 48 is a flat portion on shaft 40 adjacent first header 44. Second rod 38a may comprise a second shaft 40a, a second base end 42a, a second header 44a, a second base bevel 46a and a second flat 48a. Second header 44a is between second base end 42a and second base bevel 46a. Second base bevel 46a leads into second flat 48a. Second flat 48a is a flat portion on second shaft 40a. Base 12 may further comprise material removed from base bottom 29 to form a base cavity 50. Rod screw holes 28 are formed in base 12 adjacent to rods 38 and 38a respectively. Rod screws 22 are disposed in rod screw holes 28. Screw holes 28, 28a may be beveled or counter sunk to allow the screw head to traverse into the adjacent rod chamber 64, 64a and bear against rod 38, 38a. Side plate 14 may further comprise body screw holes 52 formed in body bottom 18. Body screws 54 may be threadably disposed in body screw holes 52.

Referring to FIG. 5, first rod 38 may further comprise a first header 44, a first body end 56, a first body flat 58, a first body bevel 59, second body bevel 61 and a first body header 62. Second rod 38a may further comprise a second body end 56a, a second body flat 58a, a third body bevel 59a, a fourth body bevel 61a and a second body header 62a. Base 12 may further comprise first rod chamber 64 extending from first side 16 through base 12 between base top 20 and base bottom 29 and opening into and in communication with cavity 50. First rod end 42 is between first side 16 and second side 66. Second rod chamber 64a extending from first side 16 through base 12 and opening into cavity 50. First rod 38 slidingly in first rod chamber 64. Second rod 38a slidingly in second rod chamber 64a. First rod 38 and second rod 38a may extend into cavity 50. First rod chamber 64 and second rod chamber 64a may be generally parallel to each other. First rod screw hole 28 is in communication with first rod chamber 64. Second rod screw hole 28a is formed in body 18 adjacent to and in communication with second rod chamber 64a. A portion of the respective base screws 22 extends into the adjacent rod chamber 64, 64a.

Continuing to refer to FIG. 5, side plate 14 may be attached to first rod 38 and second rod 38a. First rod hole 68 may be formed in body 18 having an opening in body inside 24. Second rod hole 68a is formed in body 18 extending from body inside 24 through body 18. Second rod 38a is disposed in second rod hole 68a. First body screw hole 52 is formed in body 18 adjacent first rod hole 68. First body screw hole 52 is in communication with first rod hole 68. Second body screw hole 58a is formed in body 18 adjacent to and in communication with second rod hole 68a. A portion of the respective base screws 22 extends into the adjacent rod hole 68, 68a. Screw holes 28, 28a may be beveled or counter sunk to allow the screw head to traverse into the adjacent rod chamber 64, 64a and bear against rod 38, 38a.

Continuing to refer to FIG. 5, the first base bevel 46 adjacent the first base end 42. The third base bevel 60 between the first base bevel 46 and the first body end 56. The first base rod screw 22 disposed adjacent the first base flat 48 whereby the first rod screw 22 may bear against the first base bevel 46 or third base bevel 60 capturing the first rod 38 in the first rod chamber 64. First header 44 may be disposed between the first base end 42 and first base bevel 46 having a size small enough to fit in first rod chamber 64 but too large to clear the first rod screw 22 in first rod chamber 64 whereby first rod 38 is retained attached to base 12. The first rod 38 may be removed by removing the rod screw 22 from the body 12. The first rod 38 may be pressed into or removably attached to the body 12.

Referring to FIG. 6, the camera L-plate 14 may comprise a base plate 12, a side plate 14, a first rod 38 and a second rod 38a. The base plate 12 may comprise a base bottom 29, a first base side 16, a second base side 26, a first rod chamber 64, a second rod chamber 64a, a first rod screw hole 28 and a second rod screw hole 28a. The first rod chamber 64 in the base 12 extending from the first side 16 to the cavity 50. The first screw hole 28 in the base 12, The first rod chamber 64 having opening 65 on first base side 16 may be in communication with the first screw hole 28. The second rod chamber 64a in the base 12 extending from the first side 16 to the cavity 50. The second rod chamber 64a spaced from and generally parallel to the first rod chamber 64. The second screw hole 28a in the base 12. The second rod chamber 64a in communication with the second screw hole 28a. The first rod screw 22 in the first rod screw hole 28. The second rod screw 22a in the second rod screw hole 28a. The side plate 14 comprising a body 18 having a body bottom 66, a body inside 24, a body outside 69 and a top 32. The first rod 38 comprising a first base end 42 and a first body end 56. The second rod 38a comprising a second base end 42a, a second body end 56a and a second body flat 58a. The first body end 42 in the first rod chamber 64. The first rod 38 slidably in the first base 12. A first rod screw 22 extending into the first rod chamber 64. The first rod screw 22 spaced from the first base flat 40. The second body end 42a in the body 16. The second rod 38a slidably in the second rod chamber 64a. A second rod screw 22a in the second rod screw hole 28a bearing against the second base flat 48a. The first threaded body hole 52 adjacent to and in communication with the first rod hole 68, a first body screw 70 in the first threaded body hole 52.

Referring to FIG. 7, base 12 is attached to side plate 14 by first rod 38 and second rod 38a slidably in base 12. First rod 38 and second rod 38a extend from base 12 to engage side plate 14. Camera 72 may have first side 75 adjacent side plate 14 and bottom 74 attached to base 12. Side plate 14 is held in a predetermined open position 78 having side plate 14 spaced from camera 72. Rods 38, 38a may be clamped in extended position to base 12.

Referring to FIGS. 5, 6 and 7, the base flats 48, 48a provide clearance from base screws 22, 22a to allow rods 38, 38a to traverse in the respective rod chambers 64, 64a when rods 38, 38a are disposed having flats 48, 48a adjacent base screws 22, 22a respectively. Base screws 22, 22a will not clear headers 44, 44a, respectively, as rods 38, 38a, traverse to a position having the screws 22, 22a bear against header 44, 44a. Screws 22, 22a bearing against headers 44, 44a respectively retains rods 38, 38a in the respective rod chambers 64, 64a.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given. Further, the present invention has been shown and described with reference to the foregoing exemplary embodiments. It is to be understood, however, that other forms, details, and embodiments may be made without departing from the spirit and scope of the invention which is defined in the following claims.

We claim:

1. A camera L-plate fixture for use with a camera, the camera having a base, a front and a first side, the camera L-plate fixture comprising:
 a base plate, the base plate comprising a base top, a base bottom, a first base side, a second base side, a first rod chamber and a first base screw hole, the camera base on the base top, the first rod chamber formed in the base, the first rod chamber comprising a first rod chamber opening, the first rod chamber opening in the first base side, the first base screw hole in communication with the first rod chamber, a first base screw in the first base screw hole;

a side plate, the side plate comprising a body having a bottom, an inside, an outside and a top, the side plate adjustably spaced from the camera first side, the body adjustably connected to the base plate; and a first rod, and a second rod, the first rod having a first base end, a first base flat and a first body end, the first rod slidably in the first rod chamber, the first base flat partially in the first rod chamber, the first body end attached to the body, the first base flat having a first base bevel, the first base bevel adjacent the first base end, the first base flat disposed adjacent the first base screw hole, the first base screw disposed in the first base screw hole, the first base screw spaced from the flat, the second rod slidably attached to the base, the second rod attached to the body, the second rod spaced from and generally parallel to the first rod whereby the first rod is captured in the first rod chamber.

2. The camera L-plate fixture of claim 1, wherein the first base screw bears against the first base bevel.

3. The camera L-plate fixture of claim 1, wherein the first rod further comprises a body flat, the body further comprising a first rod hole and a first threaded body screw hole, the first rod hole comprising a first rod hole opening on the body inside, the first body flat between the first base flat and the first body end, the first body screw hole adjacent to and in communication with the first rod hole, a first body screw in the first body screw hole, the first body screw spaced from the first body flat.

4. The camera L-plate fixture of claim 3, wherein the first body screw bears against the first body end whereby the first rod is retained on the body.

5. The camera L-plate fixture of claim 3, the second rod further comprising a second body flat, the body further comprising a second screw hole and a second body screw hole, the second rod hole comprising a second rod hole opening on the body inside, the second body flat between the second base flat and the second body end, the second body screw hole adjacent to and in communication with the second rod hole a second body screw in the second body screw hole, the second body screw bearing against the second base end.

6. The camera L-plate fixture of claim 1, the base further comprising a second rod chamber and a second base screw hole, the second rod chamber comprising a second rod chamber opening, the second base screw hole in communication with the second rod chamber, the second rod slidably retained in the second rod chamber, a second base screw in the second base screw hole.

7. The camera L-plate fixture of claim 6, further comprising a first header on the first rod, a second header header on the second rod, the first header adjacent the first body flat, the first header bearing against the first body screw, the second header bearing against the second base screw.

8. The camera L-plate fixture of claim 1, further comprising a second base screw, the second rod further comprising a second base end, a second base flat and a second body end, second rod slidably in the second rod chamber, the second body end attached to the body, the second base screw disposed adjacent the second rod flat, the second base screw spaced from the second flat whereby the second rod is slidably retained in the second rod chamber.

9. The camera L-plate fixture of claim 1, further comprising a first header on the first rod, the first header adjacent the first body flat, the first header bearing against the first body screw.

10. The camera L-plate fixture of claim 1, wherein the first base screw bears against the first base bevel.

11. A camera L-plate fixture for use with a camera, the camera having a base, a front and a first side, the camera L-plate fixture comprising:

a base plate, the base plate comprising a base top, a base bottom, a first base side, a second base side, a first rod chamber, a second rod chamber, a first base screw hole and a second base screw hole, the camera base on the base top, the first rod chamber formed in the base, the first rod chamber comprising a first rod chamber opening, the first rod chamber opening in the first base side, the first base screw hole in communication with the first rod chamber, a first base screw in the first base screw hole, the second rod chamber comprising a second rod chamber opening, the second base screw hole in communication with the second rod chamber, the second rod in the second rod chamber, a second base screw in the second base screw hole;

a side plate, the side plate comprising a body having a bottom, an inside, an outside and a top, the side plate adjustably spaced from the camera first side, the body adjustably connected to the base plate; and a first rod and a second rod, the first rod having a first base end, a first base flat and a first body end, the first rod slidably in the first rod chamber, the first base flat partially in the first rod chamber, the first body end attached to the body, the first base flat having a first base bevel, the first base bevel adjacent the first rod end, the first base flat disposed adjacent the first base screw hole, the first base screw disposed in the first base screw hole is spaced from the flat whereby the first rod is captured in the first rod chamber, the second rod further comprising a second base flat, the second base flat in the second rod chamber, the second base screw spaced from the second base flat.

12. A camera L-plate fixture for use with a camera, the camera having a base, a front and a first side, the camera L-plate fixture comprising a base plate, a side plate, a first rod and a second rod, the base plate comprising a base top, a base bottom, a first base side, a first rod chamber, a second rod chamber, a first base screw hole and a second base screw hole, the side plate comprising a body having a bottom, an inside, an outside and a top, the first rod comprising a first base end, a first body end, a first base flat and a first body flat, the second rod comprising a second base end, a second body end, a second base flat and a second body flat, the first rod chamber in the base, the first base screw hole in the base, the first rod chamber in communication with and generally perpendicular to the first screw hole, a first header on the first base end, the second rod chamber in the base, the second rod chamber spaced from and generally parallel to the first rod chamber, the second base screw hole in the base, the second rod chamber in communication with and generally perpendicular to the second base screw hole, a first base screw in the first base screw hole, a second base screw threadably in the second base screw hole, the first rod slidably in the first rod chamber, the first base screw spaced from the first base flat, the second rod slidably in the second rod chamber, a second base screw in the second base screw hole spaced from the second base flat, a second header on the second base end, the first header bearing against the first base screw, the first body end on the body, the second body end on the body, whereby the body is spaced an adjustable spacing from the base by the first rod and second rod sliding in the first rod chamber and second rod chamber respectively.

13. The camera L-plate fixture of claim 12, wherein the the second header bears against the second base screw.

14. The camera L-plate fixture of claim 13, wherein the base further comprises a cavity in the bottom, the first rod chamber extending from the first base side to the cavity, the second rod chamber extending from the first base side to the cavity.

15. The camera L-plate fixture of claim 12, wherein the body further comprises a first rod hole, a first body screw hole, a second rod hole and a second body screw hole, a first body screw in the first body screw hole, a second body screw in the second body screw hole, the first rod hole in communication with the first body screw hole, the second rod hole in communication with the second body screw hole, the first body flat in the first rod hole adjacent the first screw hole, the second body flat in the second rod hole adjacent the second screw hole, the second body screw spaced from the second body flat.

16. The camera L-plate fixture of claim 12, wherein the first header bears against the first base screw, the second header bears against the second base screw.

* * * * *